Figure 1:
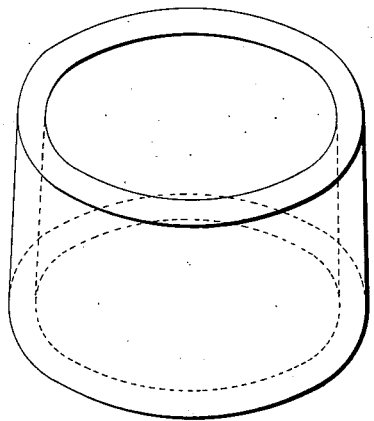

Aug. 27, 1935.  G. R. LOCKHART  2,012,723
MANUFACTURE OF RAYON
Filed Dec. 15, 1932  3 Sheets-Sheet 1

Aug. 27, 1935.  G. R. LOCKHART  2,012,723
MANUFACTURE OF RAYON
Filed Dec. 15, 1932  3 Sheets-Sheet 2

Witness
H. C. Van Dine.

Inventor
George R. Lockhart
by Van Everen Fish
Hildreth & Hay Attys.

Aug. 27, 1935.  G. R. LOCKHART  2,012,723
MANUFACTURE OF RAYON
Filed Dec. 15, 1932  3 Sheets-Sheet 3

Witness
H. E. Van Dine

Inventor
George R. Lockhart
by Van Everen Fish
Hildreth & Cary Attys.

Patented Aug. 27, 1935

2,012,723

UNITED STATES PATENT OFFICE 2,012,723

MANUFACTURE OF RAYON

George R. Lockhart, Providence, R. I., assignor, by mesne assignments, to Manville Jenckes Corporation, a corporation of Delaware Application December 15, 1932, Serial No. 647,368

12 Claims. (Cl. 18—54)

The present invention relates to a method of manufacture of rayon (artificial silk) threads, and is intended primarily as an improvement in methods of handling and treating the thread subsequent to the formation of the cake in accordance with the so-called pot spinning method.

With the present day practice, after the cake has been aged, the thread is wound from the cake to form skeins, which are subjected to a number of processing operations including washing, desulphurizing, bleaching and further washing. The skeins are then stretched, dried and inspected.

In order to avoid the relatively large number of handlings and the relatively high percentage of seconds or inferior thread produced by this process, attempts have been made to process the silk in the cake form without the intervening steps of forming skeins. So far as the applicant is aware, these attempts have been directed mainly to the provision of means for forcing the various processing liquids through the cakes, which are then dried and the thread wound onto skeins or onto spools or bobbins for commercial use. These methods as so far developed, however, have not proved entirely satisfactory owing to the difficulty in securing a permeation of the processing liquids evenly throughout the thread mass to secure a uniform high grade product. It has been found, for instance, that there is a tendency for the processing liquids when forced under pressure through the comparatively hard and rigid mass of the thread and salts clinging thereto, to break or damage the threads and to form channels or ridges through the cake.

In carrying out the present invention, a new step in the process of treating the cake has been evolved which consists in uniformly loosening the texture of the cake as formed by the pot spinning and ageing processes to permit an easy and uniform permeation of the processing liquids through the cake.

The step of loosening the texture of the cake as herein disclosed is accomplished by mechanically working the cake which acts to break up the comparatively rigid and semi-crystallized structure of thread and salts clinging thereto into a supple and easily permeable mass which will permit a rapid and uniform permeation of the cake by the processing liquids.

A further step of the method herein disclosed, to illustrate a preferred form of the invention, consists in mounting the cake or cakes treated as above described on a horizontal bar which is passed successively through a series of baths to process the cake in the usual manner employed in processing the skeins formed from the cake with the present day commercial pot spinning method of producing artificial silk.

In order to facilitate handling the cake and to increase the efficiency of the steps above described, the present invention contemplates the use of a wrapping which is placed through and around the cake as it comes from the ageing room, and is maintained in position during each of the steps of softening or loosening the texture of the cake, processing and drying.

It will be understood that the several steps of the process outlined above while particularly valuable when used in connection with the preferred method herein disclosed, may be separately incorporated with existing methods of producing artificial silk, and are not to be limited in their application to the specific method described.

Figure 2:
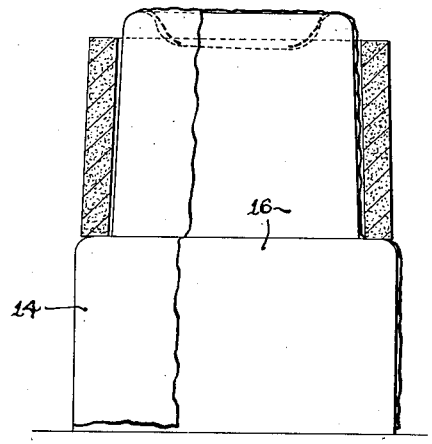
Figure 3:
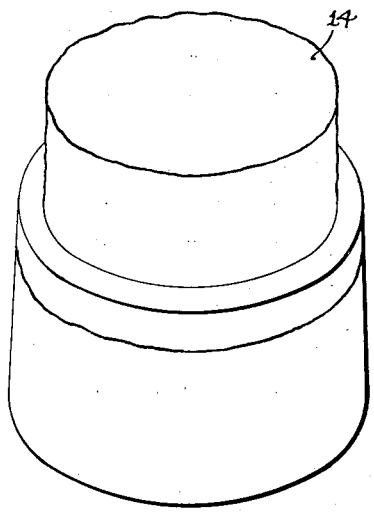
Figure 4:
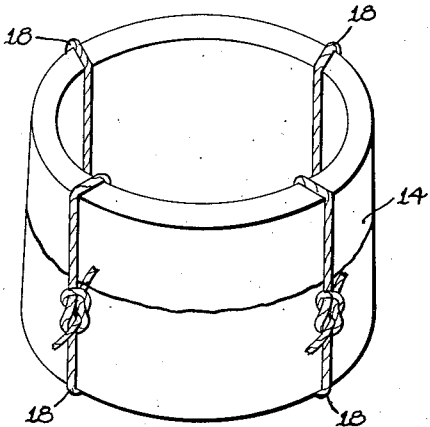
Figure 7:
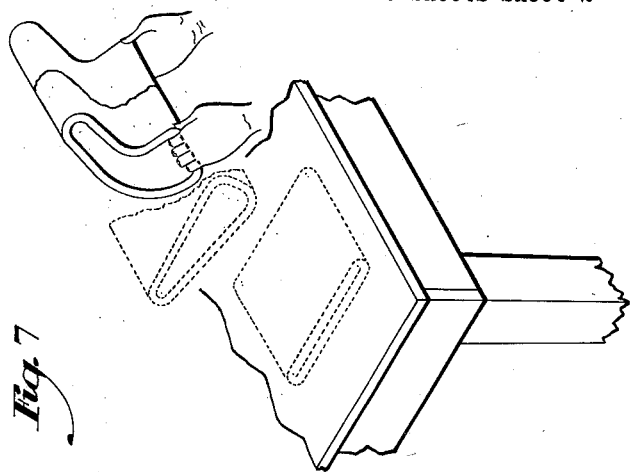
Figure 6:
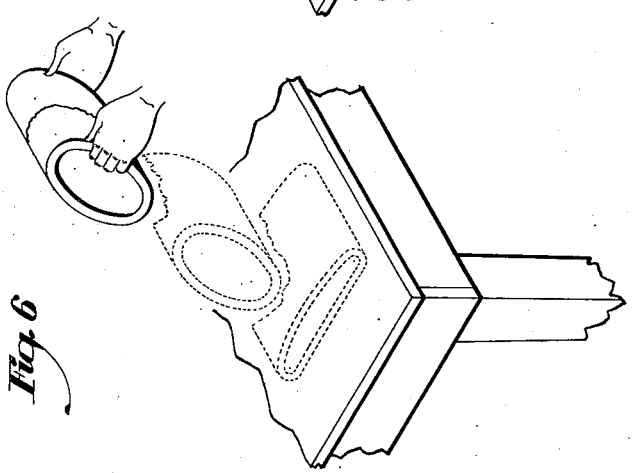
Figure 5:
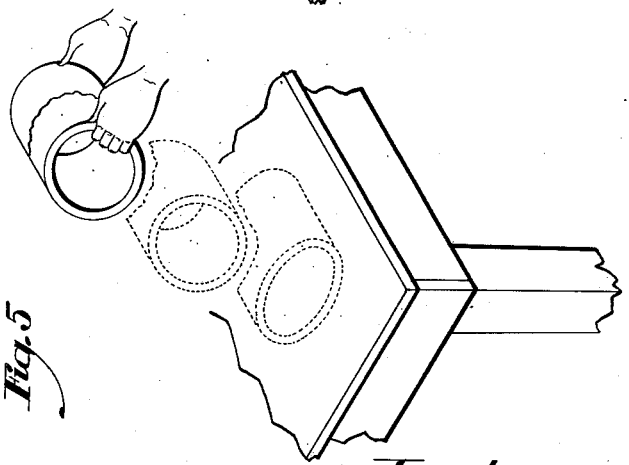
Figure 10:
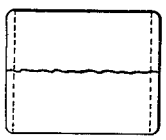
Figure 9:
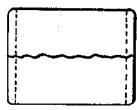
Figure 8:
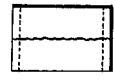
Figure 11:
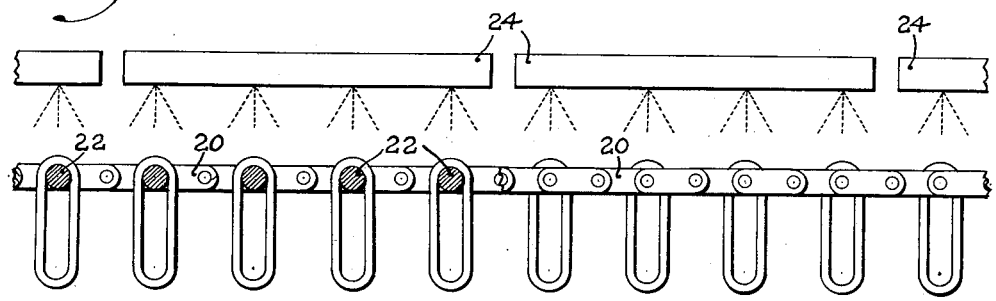
Figure 12:
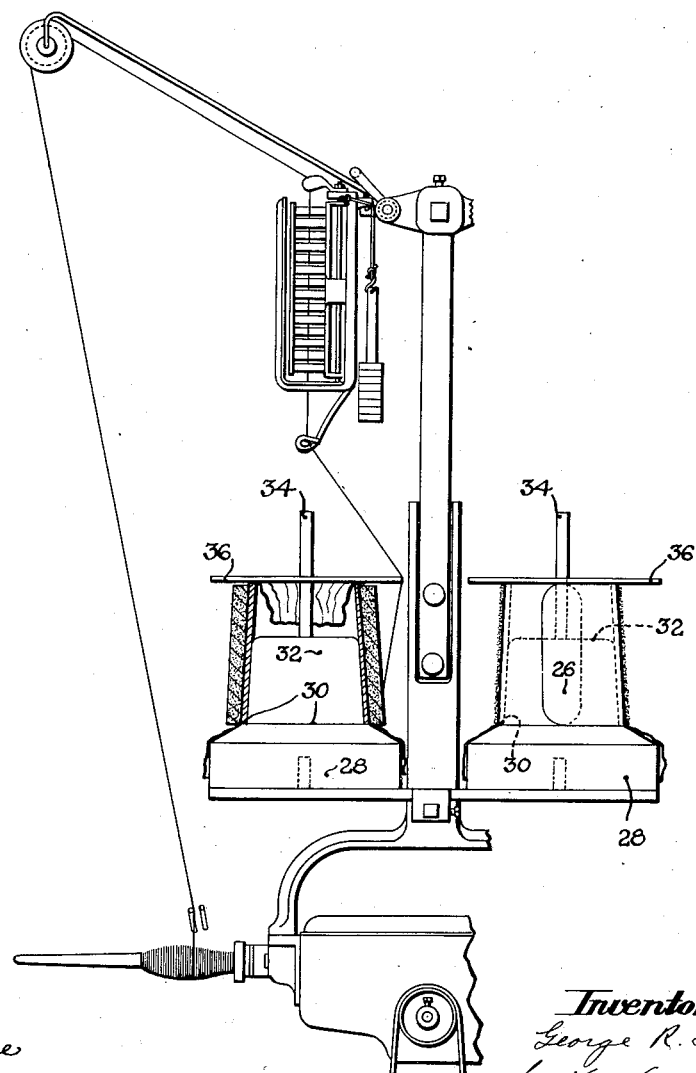

The details and general scope of the several steps of the method hereinafter described and claimed, together with the advantages to be obtained thereby, will be readily understood by one skilled in the art from the following description when taken in connection with the illustrative drawings, in which Fig. 1 is a perspective view of a cake formed by the pot spinning method; Fig. 2 illustrates the cake and the wrapping placed on a form to facilitate placing the wrapping about the cake; Fig. 3 shows the lower end of the wrapping turned upwardly over the outside of the cake; Fig. 4 shows the completely wrapped cake with the upper edge of the wrapping laid downwardly over the upper edge onto the outside of the cake; Figs. 5, 6, and 7 illustrate in a somewhat diagrammatic manner three successive stages in the mechanical working of the wrapped cake to place it in condition for the subsequent processing operations; Figs. 8, 9, and 10 correspond respectively to Figs. 5, 6, and 7, are side views of the cake to show particularly the manner in which the cake is extended during the treating operation to separate or spread the threads in the cake; Fig. 11 is a somewhat diagrammatic view in side elevation to illustrate the manner in which the cakes are mounted on carrier rods for treatment in successive processing baths; and Fig. 12 is a view in side elevation of the cake supported in a winding machine with the outside portion of the wrapping thrown back for winding.

In carrying out the present invention, the several steps of the improved method of manufacturing artificial silk have been applied to the manufacture of viscose rayon in accordance with the so-called pot spinning process. The viscose solution is precipitated in a coagulating bath, and the newly formed threads are spun into a rapidly rotating pot to form a cake which is then set aside for ageing in accordance with the usual practice. The cake formed in this manner, as shown in Fig. 1, comprises a rigid cylindrical mass of threads and quantities of salts and other impurities which have been precipitated with the threads and combine therewith during the pot spinning and ageing process to give the cake its characteristically rigid and impenetrable structure. The cake in this form has been found to be extremely resistant to the action of the various liquids to which the cake must be subjected to produce the finished product. In present commercial practice the thread is wound from the cake onto skeins which are loose in texture, and readily permit the permeation of the liquids, in the several processing baths uniformly, throughout the thread mass. Attempts have been made to overcome the resistance of the thread mass to the action of the processing liquids by forcing these liquids under pressure through the cake. These attempts, however, as above stated, have not been entirely successful due to the tendency of the liquid when forced under pressure through the cake to form channels which tend to prevent the uniform distribution of the processing liquids throughout the cake. The uneven distribution of pressure resulting from the formation of these channels has the further disadvantage of subjecting the adjacent threads to an excessive strain which results in damage to or breaking of the threads.

A very important step of the method herein disclosed, consists in so altering the texture and general structure of the cake as it comes from the ageing room, as to permit an easy and uniform permeation of the processing liquids through the cake, whether these liquids are forced through the cake under pressure, or the cakes are merely subjected to the action of various baths such as now used in processing skeins. This step in the method consists primarily in breaking up as much as possible the comparatively rigid and semi-crystallized structure of the salts and other impurities in the cake into a supple, pliable mass. The change in the texture of the cake produced by this step, has been found to permit a rapid and uniform permeation of the cake by the processing liquids.

With the preferred form of the method herein disclosed, the step of breaking up or loosening the semi-crystalline structure and texture of the cake is accomplished by mechanically working the cake until it becomes a supple and pliant mass. This operation as best shown in Figs. 5 to 10 inclusive, may be performed manually by pounding the cake and flattening it successively in a number of positions. In order further to assist in opening up the texture of the cake to permit the easy permeation of the processing liquids, the cake is at the same time expanded lengthwise, preferably to about one and a half times its original height to reduce the number of threads per unit of area in cross-section. Successive stages in this process are clearly illustrated in Figures 8 to 10 inclusive.

In order to maintain the relationship of the threads in the cake during this process, and to prevent injury thereto from the mechanical handling above described, another step of the present method contemplates the placing of a porous and elastic wrapping through and around the cake as it comes from the ageing room. This wrapping preferably comprises a tubular knitted fabric which has sufficient elasticity to permit the working and stretching of the cake, and will at the same time maintain undisturbed the relationship of the threads in the cake during the several steps of working and processing to produce the finished product.

As illustrated in Figs. 2, 3, and 4 of the drawings, the tubular fabric or wrapping 14 is placed on a form 16, and the cake placed over it as shown in Fig. 2. The lower part of the wrapping is then drawn up over the cake substantially to its upper edge, as shown in Fig. 3, and the upper portion of the wrapping is then folded down over the upper edge of the cake, as shown in Fig. 4, to complete the wrapping. The wrapping is held in place by means of a number of strings 18 tied through and around the cake at different points in its periphery. The cake wrapped in this manner is then mechanically worked, as shown in Figs. 5 to 10 inclusive, by successively turning and pounding adjacent portions of its periphery against a table until the whole cake has become a pliant and supply mass which when placed on its side naturally falls into the substantially flat position shown in Figs. 7 and 10. This process tends to lengthen out the cake to some extent as the particles of salt and other impurities in the cake are loosened. The lengthening of the cake may be further increased by the operator who grasps both edges at successive points on the periphery and successively stretches adjacent portions of the cake wall.

The cake is now in condition for the several processing operations necessary to produce the finished product. With the preferred method herein disclosed, the cake is next processed in the same manner and on the identical apparatus commercially used for processing the skeins of silk wound from the cake in accordance with commercial practice in the pot-spinning method. The apparatus used is well known in the art, and is therefore herein only briefly illustrated and described.

This apparatus as shown in Fig. 11, comprises two parallel carrier chains 20 which are arranged to receive between them a series of horizontal bars 22 on which the skeins, or in the present instance, the cakes prepared as above described, are placed. The bars are moved gradually forward and are rotated to pass the silk supported thereon through a series of processing spray baths, such as that indicated at 24 in Fig. 11. These processing operations may include the following steps,—washing with hot water, desulphurizing with sodium sulphide, washing with cold water, a chlorine bleach, washing again with cold water, an acid bath comprising sulphuric acid, washing with cold water, and soaping.

In processing skeins in the manner above described in accordance with the usual commercial practice, it has been found impossible to prevent injury to a relatively high percentage of the skeins passing through the processing machine, due to the tendency of the skeins to become attached to or matted against the bars. These matted portions whenever they occur, prevent the proper unwinding of the thread from the skein, and therefore result in the production of an inferior product which is of relatively little value. It has been found that the method herein disclosed of processing the cakes with a wrapping which covers the inner walls of the cake, serves to prevent matting of the threads as above described in connection with the processing of skeins, so that injury to the finished product from this cause is entirely eliminated, and the attendant waste reduced almost to the vanishing point.

Due to the excellent preservation of the silk in the original cake form when wrapped as above described, it has been found possible to dry the cake and wind directly onto spools or bobbins or into skeins for commercial use as required, without the intervening expensive and injurious handling found necessary in connection with the processing of skeins in accordance with present day commercial methods.

The cake is now placed in a winding machine such as that disclosed in Fig. 12, which is assembled as follows,—A collapsible band 26 which may be of any convenient material such as celluloid, is placed within the cake to maintain it in a substantially circular position, and the cake and band are placed on a base or support 28 which is provided with a ledge 30 for supporting the band and the cake mounted thereon, and an interior drum 32 to maintain the expanded cake in position. An upwardly extending spindle 34 concentric with the base is arranged to receive a disk 36 which serves to guide the thread away from the cake during the unwinding process. Before the disk is placed in position, the upper portion of the wrapping is turned back inside the upper edge of the collapsible band, and the lower portion of the wrapping is turned down over the base, leaving the cake free for the winding operation.

It will be noted that with the method herein described, the wrapping is utilized to protect the threads during all of the processing and handling operations subsequent to the ageing of the cake, thus entirely eliminating the possibility of injury or dis-arrangement of the threads prior to the unwinding of the finished thread from the cake.

The invention having been described, what is claimed is:

1. The method of producing threads of artificial silk which comprises forming a cake, placing a porous wrapping through and around the cake, mechanically working the wrapped cake to thoroughly break down and loosen all portions of the cake, and thereafter processing the wrapped cake by fluid treatment.

2. The method of producing threads of artificial silk which comprises forming a cake, placing an elastic porous wrapping through and around the cake, mechanically working the wrapped cake to thoroughly break down and loosen all portions of the cake and to extend it laterally of the wind, and thereafter processing the wrapped cake by fluid treatment.

3. The method of producing threads of artificial silk which comprises forming a cake, mechanically working the cake to thoroughly break down and loosen all portions of the cake, and thereafter processing the cake by fluid treatment.

4. The method of producing threads of artificial silk which comprises forming a cake, mechanically working the cake to thoroughly break down and loosen all portions of the cake and to extend it laterally of the wind, and thereafter processing the cake by fluid treatment.

5. The method of producing threads of artificial silk which comprises forming a cake, supporting the cake to maintain a substantially constant relationship of the windings during subsequent processing operations, mechanically working the cake to thoroughly break down and loosen all portions of the cake, and thereafter processing the supported cake by fluid treatment.

6. The method of producing threads of artificial silk which comprises forming a cake, supporting the cake to maintain a substantially constant relationship of the windings during subsequent processing operations, mechanically working the cake to thoroughly break down and loosen all portions of the cake and to extend it laterally of the wind, and thereafter processing the supported cake by fluid treatment.

7. The method of producing threads of artificial silk which comprises mechanically working a cake formed in accordance with the pot spinning method to extend the cake uniformly laterally of the wind, and thereafter processing the extended cake by fluid treatment.

8. The method of producing threads of artificial silk which comprises forming a cake, mechanically working the cake by flattening it successively in a large number of angular positions to thoroughly break down and loosen all portions of the cake, and thereafter processing the wrapped cake by fluid treatment.

9. The method of producing threads of artificial silk which comprises forming a cake, mechanically working the cake by flattening it successively in a large number of angular positions to thoroughly break down and loosen all portions of the cake and to extend it laterally of the wind, and thereafter processing the cake by fluid treatment.

10. In the processing of a cake of thread, the steps which comprise loosening the cake before treatment with processing fluids, and treating the cake with a processing fluid.

11. In the manufacture of artificial thread wherein the thread is spun into a cake, the steps which comprise kneading the cake before treatment with processing fluids, and treating the cake with a processing fluid.

12. In the manufacture of artificial thread wherein the thread is spun into a cake, the steps which comprise elongating the cake axially before treatment with processing fluids, and treating the cake with a processing fluid.

GEORGE R. LOCKHART.